US006055778A

United States Patent [19]

Ide et al.

[11] Patent Number: 6,055,778

[45] Date of Patent: May 2, 2000

[54] GUIDE SLIDER FOR WINDOW REGULATOR

[75] Inventors: Masaaki Ide; Hiromichi Mizuno; Yoshihiro Murase; Ryuji Utsuno, all of Aichi-ken, Japan

[73] Assignee: Aoyama Seisakusho Co., Ltd., Aichi-ken, Japan

[21] Appl. No.: 09/201,261

[22] Filed: Nov. 30, 1998

[30] Foreign Application Priority Data

Dec. 1, 1997 [JP] Japan .................................... 9-329787

[51] Int. Cl.[7] ........................................................ B60J 1/00

[52] U.S. Cl. ................................................ 49/375; 49/350

[58] Field of Search .............................. 49/374, 375, 348, 49/349, 350, 351; 16/93 R, 95 R

[56] References Cited

U.S. PATENT DOCUMENTS 5,497,578 3/1996 Wautelet et al. ...................... 49/375 X
5,647,094 7/1997 Mariel .................................. 49/351 X
5,771,534 6/1998 Church ................................. 49/351 X

FOREIGN PATENT DOCUMENTS 6137023 5/1994 Japan ...................................... 49/375

*Primary Examiner*—Jerry Redman
*Attorney, Agent, or Firm*—Baker & Daniels

[57] ABSTRACT

There is disclosed a guide slider for a window regulator that does not cause to rise an allophone, a awkward movement and a jolt to a rail in which said guide slider is made a slidable movement, wherein said guide slider comprises a substantially lod blank having a substantially spherical head at one tip end thereof and a main body of guide made of thermoplastic resin, wherein further the main body of guide has a receiving and bearing seat in which the head of the blank can be received in such a manner that the axis of the blank becomes coaxial to that of the main body of guide, and the receiving and bearing surface of the main body of guide closely contacts with the surface of the head but the slidably rotational movement of the head in the receiving and bearing seat is permitted.

3 Claims, 6 Drawing Sheets

GUIDE SLIDER FOR WINDOW REGULATOR

BACKGROUND OF THE INVENTION

This invention relates to a guide slider for a window regulator of an automobile.

As shown in FIG. 6, a window regulator of an automobile generally has a structure in which a rail 12 is fixed onto a lower region of a window 11, a guide slider which is engaged to a tip end of a regulator arm 13 which is actuated by a mortor is slidably fitted to said rail and thereby a window is moved up and down. A prior guide slider for the window regulator has a structure as shown in FIG. 7. The prior guide slider comprises a cylindrical guide 21 made of resin, which has a bottom, and a blank 22 made of steel, which has a hemispheric head at one end thereof, which is forcibly fitted into said guide, wherein said guide is used in such a manner that said guide is fitted in a rail 12.

However, the prior guide slider for the window regulator has problems as shown below.

1. Since said head of the blank 22 made of steel is forcibly fitted into the guide 21 made of resin after having formed said guide, a minute gap is prone to be formed between the receiving and bearing surface of said guide and the surface of said head. Thereby, a slidable and rotatable movement of said head in said receiving and bearing seat of said guide becomes stiff and easily causes to rise an allophone.
2. Due to said gap, said guide slider is liable to show a awkward movement during said guide slider is moved in the rail 12.
3. Since said guide is brought into contact with the rail 12 at only 2 faces in the upward and downward directions thereof, it easily cause to rise a jolt in the upward and downward directions.

SUMMARY OF THE INVENTION

An object of the present invention is to solve problems of the prior guide slider for the window regulator and to provide a guide slider for a window regulator that does not cause to rise an allophone, a awkward movement and a jolt to a rail.

The present guide slider for a window regulator comprises a substantially lod-like blank having a substantially spherical head at one tip end thereof and a main body of guide made of thermoplastic resin, wherein said main body of guide has a receiving and bearing seat in which said head of the blank can be received in such a manner that the axis of said blank becomes coaxial to that of said main body of guide, and the receiving and bearing surface of said main body of guide closely contacts with the surface of said head but the slidably rotational movement of said head in the receiving and bearing seat is permitted.

Here, the receiving and bearing surface of said main body of guide has a relationship in a spherical contraposition with the surface of said head, that is, the engaging form between said main body of guide and said blank can liken to a ball and socket joint (said main body of guide and the head of said blank function as a socket and a ball, respectively).

Incidentally, such engaging form between said main body of guide and said blank is materialized by making an insert molding of said main body of guide with a using of the head of said blank as an insert.

The present guide slider may be made concrete in such an embodiment that said blank comprises a substantially spherical head member made of thermoplastic resin and a substantially rod-like axle member made of steel, wherein said head member has a receiving and bearing seat in which the head of said axle member can be received in such a manner that the axis of said axle member becomes coaxial to that of said head member, and the receiving and bearing surface of said head member closely contacts with the surface of said head of said axle member so that the rotational movement and the falling out of said head of said axle member in and from the receiving and bearing seat of said head member is restricted, and further thermoplastic resins as the respective material for forming said head member and said main body of guide are selected from the ones which do not adhere each other.

Here, the present invention may be made concrete in such an embodiment that polybutylene terephthalate and polyacetal are selected as materials for forming said head member and said main body of guide, respectively. Further, the present invention may be made concrete in such an embodiment that polyamide and polyacetal are selected as materials for forming said head member and said main body of guide, respectively.

Incidentally, such engaging form between said axle member and said head member of said blank is materialized by making an insert molding of said head member with a using of the head of said axle member as an insert.

Furthermore, the present guide slider is made concrete in such an embodiment that said blank is the one which comprises a substantially rod-like portion and a substantially spherical portion which are made of the same metal, e.g., stainless, as a whole, and polyacetal is selected as materials for forming said main body of guide.

Incidentally, the present guide slider may preferably be the one that said main body of guide is the one having a four-sided shape and provided resilient porsions as a whole at center portions of the upper and lower sides and the left and right sides of said main body of guide, respectively.

DESCRIPTION OF THE PREFERRED EMBODIMENTS

Figure 1:
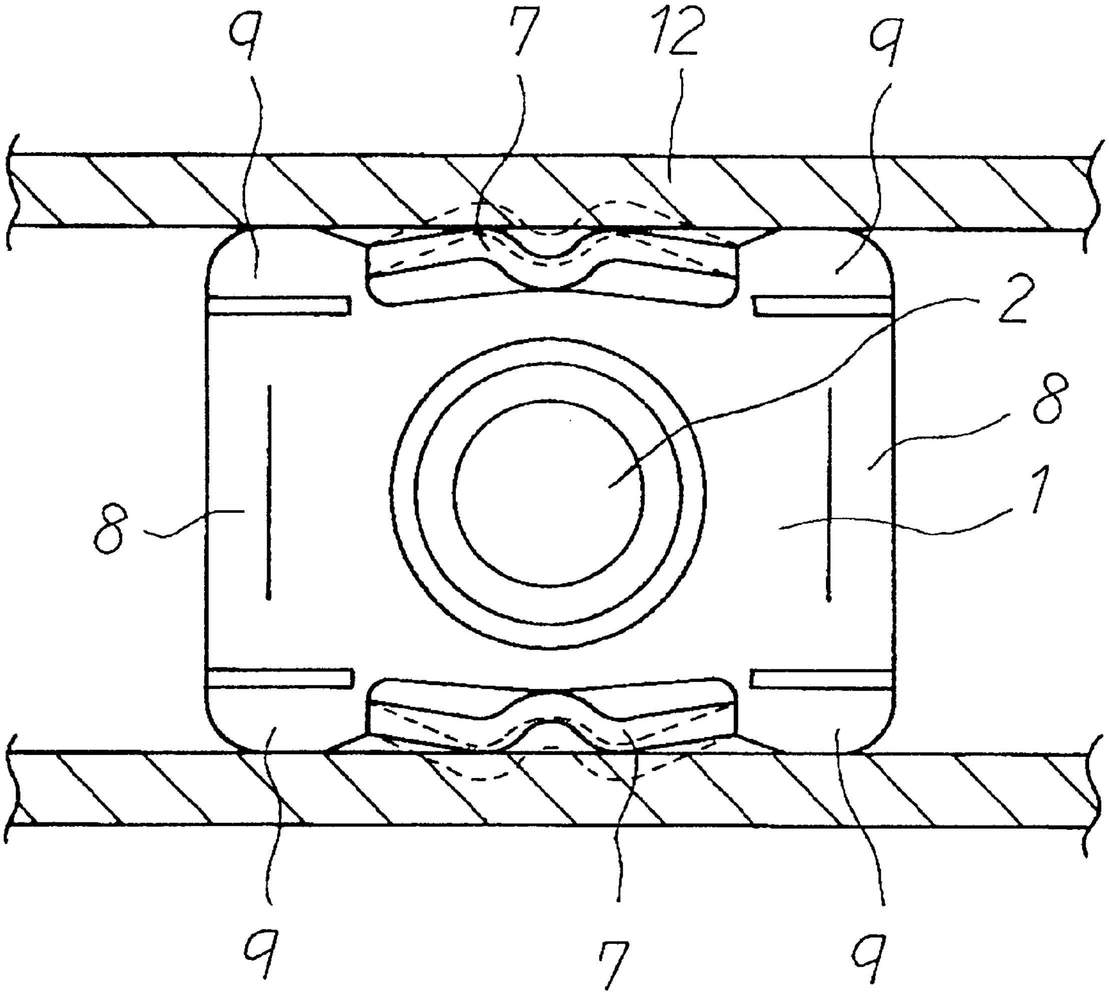
FIG. 1 is a front view showing a first embodiment of the present guide slider.
Figure 2:
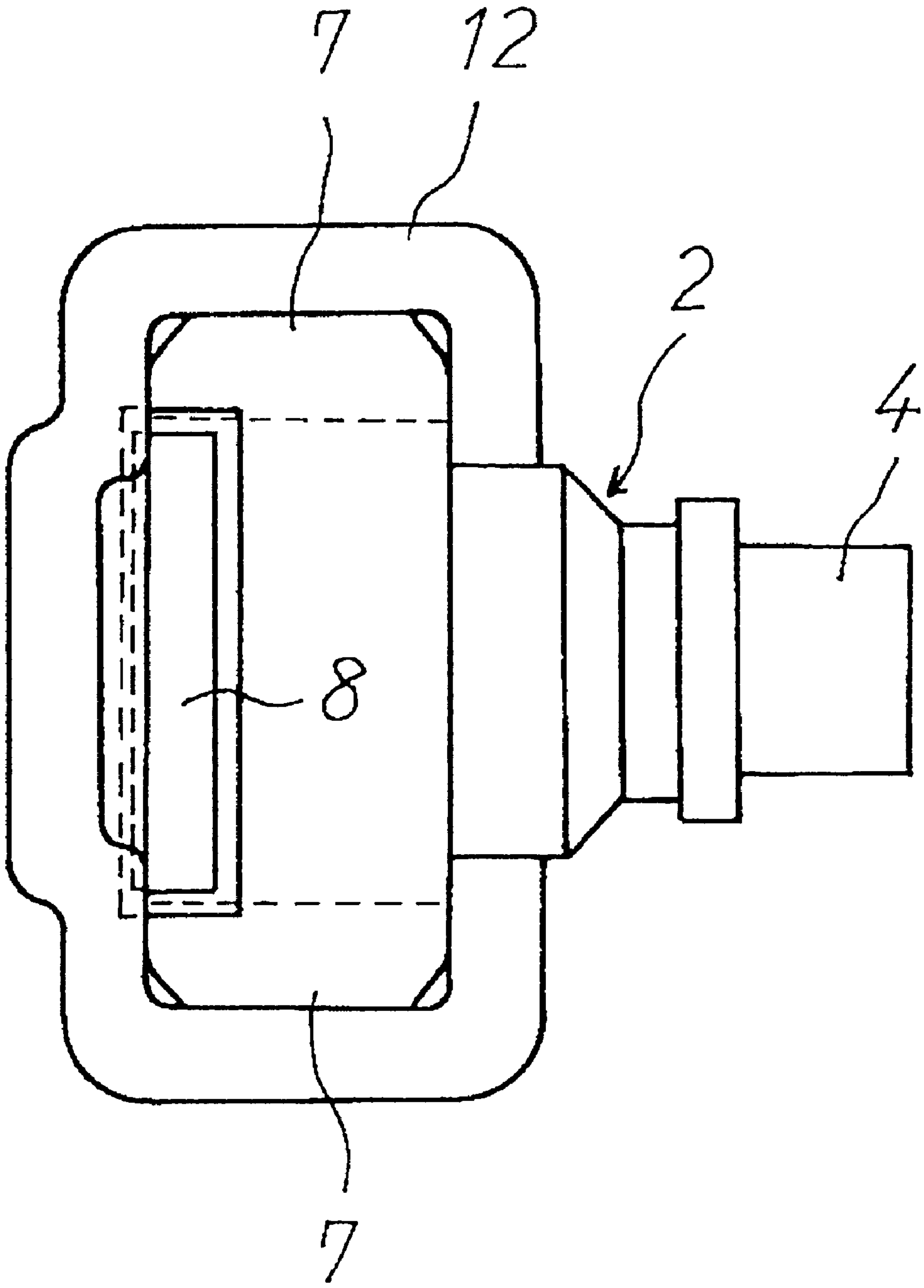
FIG. 2 is a left side view of the embodiment shown in FIG. 1.
Figure 3:
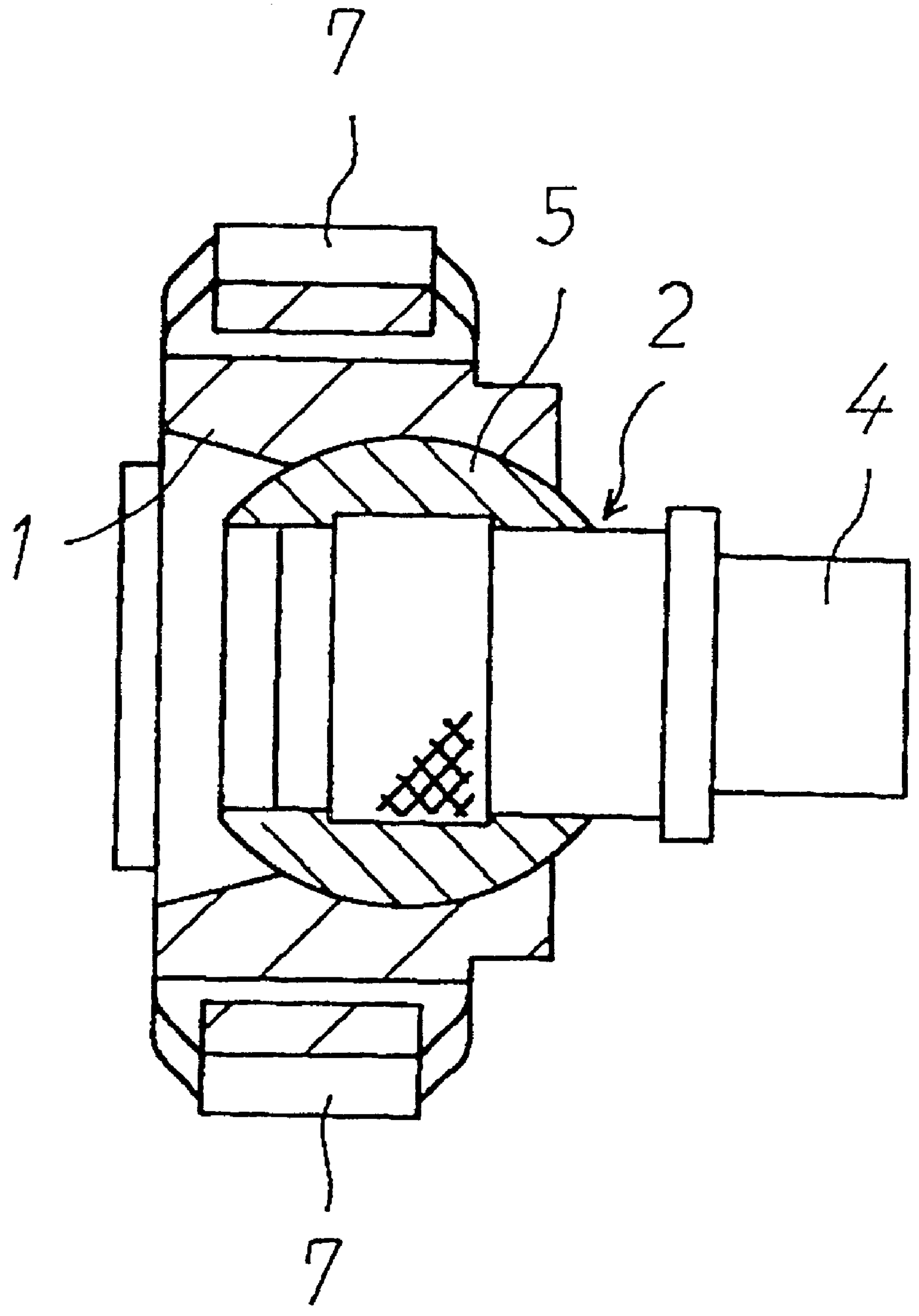
FIG. 3 is a sectional view cut along an axis line of the embodiment shown in FIG. 1.

In the following, the present invention is described in detail by referring to embodiments shown in the drawings.

As shown in FIG. 1, the present guide slider comprises a main body of guide 1 made of thermoplastic resin, which is slidably fitted into a rail 12, and a blank 2 disposed at the center of said main body of guide.

Figure 4:
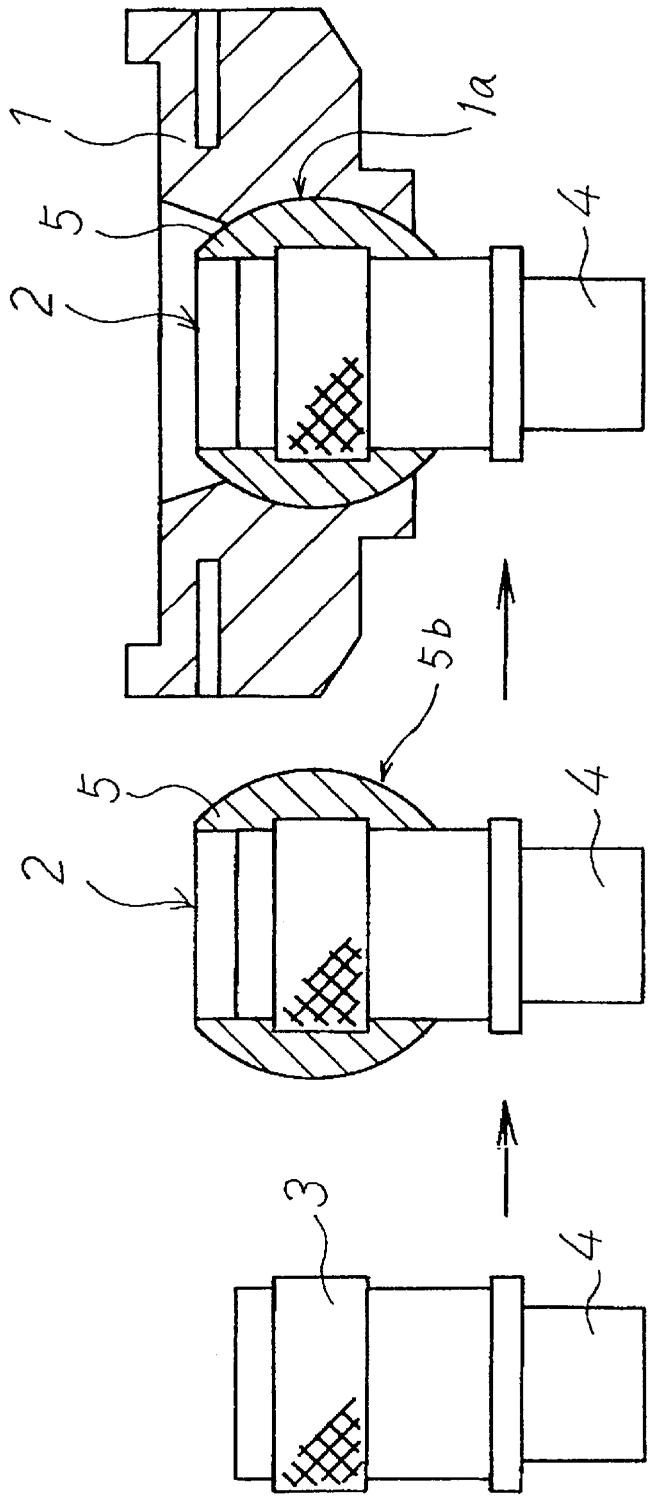
FIG. 4 is a sectional view showing the manufacturing steps of the embodiment as shown in FIG. 1.

As shown in FIG. 4, a first embodiment of the present guide slider is the one (see FIG. 4C) that may be made according to the following steps:

1. forming a blank 2 (see FIG. 4B) having a substantially spherical head member made of thermoplastic resin at one tip end thereof by making an insert molding with a using of a substantially rod-like axle member 4 (see FIG. 4A) made of steel and having a knurled head as an insert; and followed by
2. forming a main body of guide 1 (see FIG. 4C) made of thermoplastic resin by making an insert molding using the axle member as an insert.

Here, polyamide, preferably polyamide 6 or polyamide 66 (the one sold by BASF ENGINEEERING PLASTIC Co., Ltd. under the trade name "URTRAMID A 3K" may be typically exemplified) or polybutylene terephthalate (hereinafter referred to as "PBT", the one sold by POLYPLASTICS Co., Ltd. under the trade name "DURANEX" may be typically exemplified), which have a strong strength and a high hardness, may be preferably used as a material for forming the head member 5 made of thermoplastic resin. On the other hand, thermoplastic resin, which has no possibility of adhering to the substantially spherical head member 5 at the time of forming the main body of guide 5, is selected as a material for forming said main body of guide. In the event of using PBT as a material for forming said head member, polyacetal (the one sold by POLYPLASTICS Co., Ltd. under the trade name "DURACON M 25-44" may be typically exemplified) is preferably selected as a material for forming said main body of guide. Incidentally, although polyacetal itself is the material having a good abration resistance and a self-lubricating ability, an oil-impregnated resin such as oil-pregnated polyacetal resin (the one sold by POLYPLASTICS Co., Ltd. under the trade name "DURACON SW-01" may be typically exemplified) may be preferably used.

Since the head member 5 of the blank 2 in the present guide slider is utilized as an insert at the time of forming the main body of guide 1 by using an insert molding, whereas a head of a separately prepared blank is forcibly fitted into an antecedently formed main body of guide in a prior guide slider, there is no possibility of causing to substantially form a gap at the portion contacting of said head member and said main body of guide, that is the interface between the surface 5*b* of said head member and the receiving and bearing surface 1*a* of said main body of guide. Furthermore, since the thermoplastic resins, one of which does not adhere to the other, are selected as the respective material for forming said head member and said main body of guide, said blank can make a smoothly rotatable and slidable movement in said receiving and bearing seat.

Furthermore, as shown in FIG. 1, the main body of guide 1 is the one having a four-sided shape and provided resilient portions 7, 7, 8, 8 as a whole at the center portions of the upper and lower sides and the left and right sides of said main body of guide, respectively. Here, the resilient portions 7, 7 and the resilient portions 8, 8 are the ones for preventing from causing to rise a jolt in a vertical and a horizontal directions of an automobile, respectively. Incidentally, as the materials for forming said resilient portions, polyacetal (the one sold by POLYPLASTICS Co., Ltd. under the trade name "DURACON M25-44" may be typically exemplified) or oil-pregnated resin (the one sold by POLYPLASTICS Co., Ltd. under the trade name "DURACON SW-01" may be typically exemplified) may be exemplified. Further, circular arch-like protrusions 9, 9, 9, 9 are formed at the respective end portion of the upper and lower sides of said main body of guide in the upward and downward directions thereof, so that said protrusions are contacted with the rail 12 at the time of making said guide slider load a force for moving said guide slider.

The present guide slider has a constitution mentioned the above, is fitted in a window regulator as well as the prior guide slider is done, and is the one for making a going up and down movement of a window smooth. A driving force from a regulator arm 13 is transmitted to the window 11 through the blank 2, the main body of guide 1 and the rail 12. Here, since said blank and said main body of guide are fitted in such a condition that there substantially exists no gap between the surface of said head member of said blank and the receiving and bearing surface of said main body of guide, said blank can make a rotatable and slidable movement in said receiving and bearing seat of said main body of guide without causing to rise a awkward movement and with keeping an appropriate resistance therebetween. Furthermore, since the main body of guide 1 contacts with the rail through the resilient portions 7, 7, 8, 8 and the protrusions 9, 9, 9, 9, said guide slider can smoothly make a slidable movement in said rail without causing to rise a jolt and an allophone, on the whole.

Beside, the present guide slider has such an advantage that the slidable movement of said guide slider in said rail is smooth and there is no possibility for coming off of said blank, since the blank 2 is closely contacted with the main body of guide 1.

Figure 5:
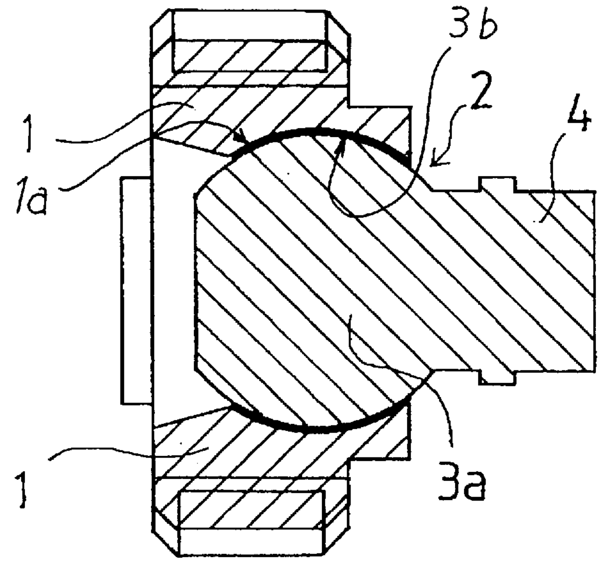
FIG. 5 is a sectional view cut along an axis line showing a second embodiment of the present guide slider.
Figure 6:
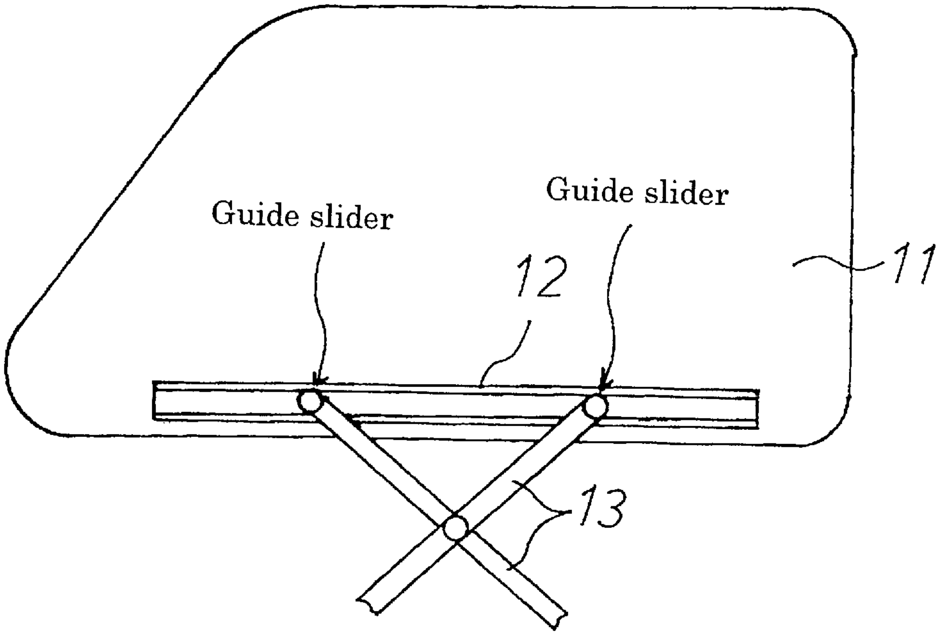
FIG. 6 is a explanatory drawing showing the general structure of a window regulator.
Figure 7:
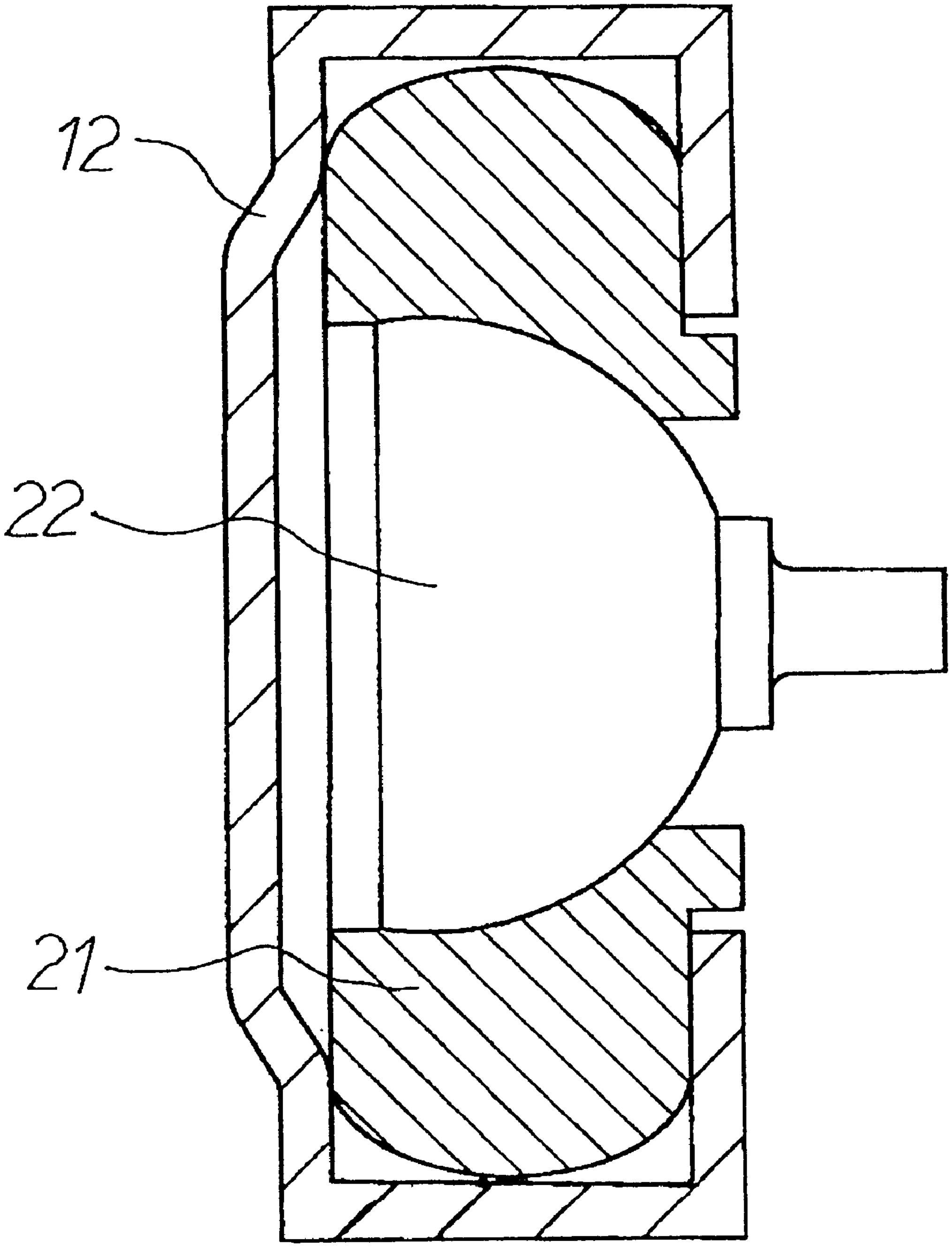
FIG. 7 is a sectional view cut along an axis line showing the prior guide slider.

Next, in the following, the second embodiment of the present invention is described. As shown in FIG. 5, it is the one which is formed by making an insert molding the main body of guide made of thermoplastic resin such as polyacetal with a using of a blank 2 as an insert, which comprises a substantially rod-like portion 4 and a substantially spherical portion which are made of the same metal, e.g., stainless, as a whole. In this embodiment, since the substantially spherical head portion can be worked simultaneously at the time of making the substantially rod-like portion in the same step, the step for making an insert molding the head member with a using of the axle member as an insert can be omitted. Excepting such advantage, said second embodiment can enjoy the other advantages as well as the first embodiment can enjoy.

What is claimed is:

1. A guide slider for a window regulator comprises a substantially rod-shaped blank having a substantially spherical head at one tip end thereof and a main body of guide made of thermoplastic resin, wherein said main body of guide has a receiving and bearing seat in which receives said substantially spherical head of the blank, said main body of said guide having a four-sided shape and at center portions of upper and lower sides and left and right sides of which resilient portions are provided, and said head can be received by said bearing seat in such a manner that the axis of said blank becomes coaxial to that of said main body of guide, and receiving and bearing surfaces of said main body of guide closely contacts with surfaces of said substantially spherical head but the slidably rotational movement of said head in the receiving and bearing seat is permitted, said substantially spherical head being made of thermoplastic resin and said blank also has a substantially rod-shaped axle member made of steel and having an upper portion that includes a knurled section, said head has a receiving and bearing seat in which the upper portion of said axle member can be received in such a manner that the axis of said axle member becomes coaxial to that of said head member, and an upper portion of said blank closely contacts with an inner surface of the receiving and bearing seat of said head so that rotational movement and falling out of the upper portion of said axle member in and from the receiving and bearing seat of said head is restricted, and further thermoplastic resins as the respective material for forming said head and said main body of guide are selected from thermoplastic resins which do not adhere each other.

2. The guide slider of claim 1, wherein said thermoplastic resin as a material for forming said head member is polybutylene terephthalate and said thermoplastic resin as material for forming said main body of guide is polyacetal.

3. The guide slider of claim 1, wherein said thermoplastic resin as a material for forming said head member is polyanide and said thermoplastic resin as material for forming said main body of guide is polyacetal.

* * * * *